May 10, 1949.

J. FRASER 2,470,025

MIXING VALVE HAVING ACCESSIBLE
PRESSURE EQUALIZING MEANS

Filed March 15, 1948

INVENTOR
JAMES FRASER
BY
John E. Hubbell
ATTORNEY

May 10, 1949.    J. FRASER    2,470,025
MIXING VALVE HAVING ACCESSIBLE
PRESSURE EQUALIZING MEANS
Filed March 15, 1948    2 Sheets-Sheet 2
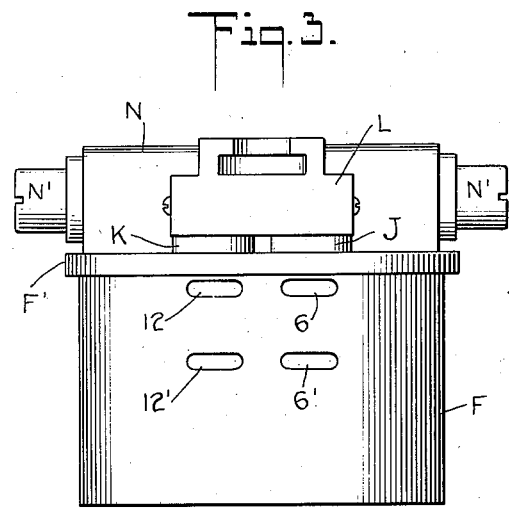
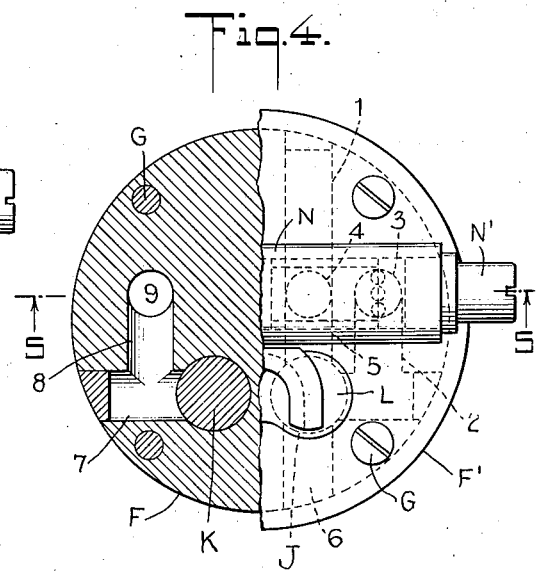
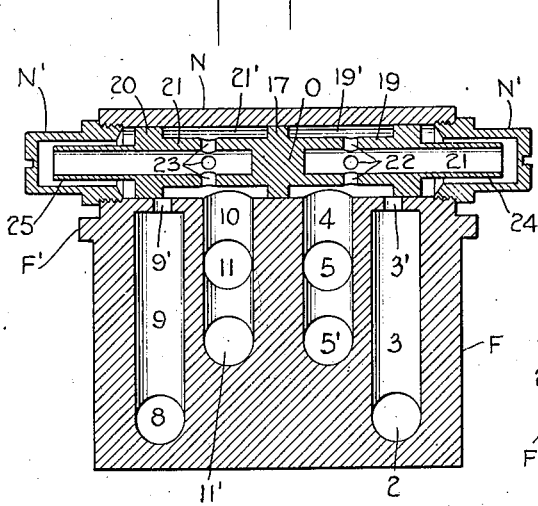
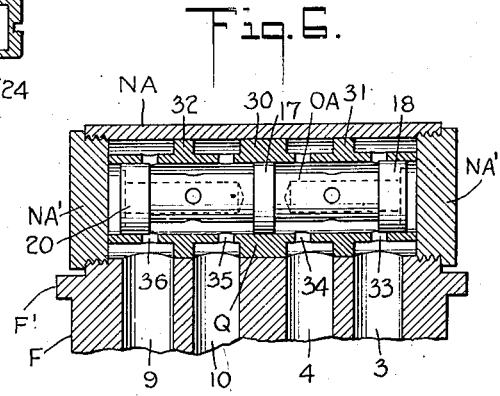
INVENTOR
JAMES FRASER
BY
John E. Hubbell
ATTORNEY Patented May 10, 1949

2,470,025

UNITED STATES PATENT OFFICE 2,470,025

MIXING VALVE HAVING ACCESSIBLE
PRESSURE EQUALIZING MEANS

James Fraser, Wilmington, Del., assignor to Speakman Company, Wilmington, Del., a corporation of Delaware Application March 15, 1948, Serial No. 14,986

3 Claims. (Cl. 277—18)

The general object of the present invention is to provide an improved mixing valve of the known type including mechanism adjustable to mix two fluids in proportions dependent on the adjustment of said mechanism, and including pressure equalizing mechanism comprising an element ordinarily in the form of a plunger or piston valve, movable in a valve chamber in automatic response to variations in the relative pressures at which the two fluids are supplied, to prevent such variations from varying the relative amounts of the two fluids included in the mixture formed when said mechanism is given a particular adjustment.

A mixing valve of the above-mentioned type finds its principal field of use in supplying hot and cold water mixtures to showerheads at temperatures controlled by valve adjustments made by the user. As is well known, the inclusion in such a valve of a pressure equalizing mechanism operative to compensate for variations in the hot and cold water supply pressures, greatly reduces the risk that the user will be scalded as a result of a sudden reduction in the pressure at which the cold water is supplied to the mixing valve, such as is apt to occur with considerable frequency.

When a mixing valve including a pressure responsive element of the above-mentioned character is used with water containing impurities which deposit on the wall of the chamber in which the pressure responsive valve element works, said element is apt to stick and become cemented to the wall of the said chamber, and be thereby made inoperative to compensate for variations in the relative supply pressures of the fluids to be measured. The position which the pressure responsive element will occupy when it sticks is fortuitous and may be such that the water discharged by the mixing valve will consist entirely of hot water or entirely of cold water, or will be a mixture having a temperature quite different from the desired temperature which the adjustment of the mixing valve would produce if the pressure equalizing mechanism were in its normal condition.

In my prior application, Serial No. 722,863, filed January 18, 1947, I have disclosed various forms of mixing valves of the character above described, each including structural provisions permitting the removal of the valve element of the pressure equalizing mechanism without disassembling the general mixing valve structure. In consequence, the pressure equalizing valve may be readily inspected, cleaned or replaced by a similar valve element in better condition, or by a replacement element which permits the mixing valve to operate in the manner in which it would operate if it had no pressure equalizing provisions, as may be desirable in some cases. In said prior application, the chamber in which the pressure equalizing valve element works is like a well in that it extends into the mixing valve structure from one side of the latter, and is like a well in having its inner or bottom end permanently closed.

The primary object of the present invention is to provide an improved arrangement of pressure equalizing mechanism in a mixing valve structure adapted to facilitate the removal and replacement of the movable valve element of the mechanism when desirable. More specifically, the object of the invention is to provide a mixing valve arrangement including the chamber in which a pressure equalizing valve element is mounted for axial movement which is so formed and disposed that each end of said chamber may be readily opened for the removal of said valve element and for the inspection of said chamber.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Of the drawings:

Fig. 3 is an elevation, at right angles to Fig. 1, of a separable block element of the valve structure shown in Figs. 1 and 2;

Fig. 4 is an end view of the block element shown in Figs. 2 and 3, with its left half portion in section on the line 4—4 of Fig. 2;

Fig. 5 is a section on the line 5—5 of Fig. 4, and

Fig. 6 is a view taken similarly to Fig. 5 illustrating a modified pressure equalizing arrangement.

Figure 1:
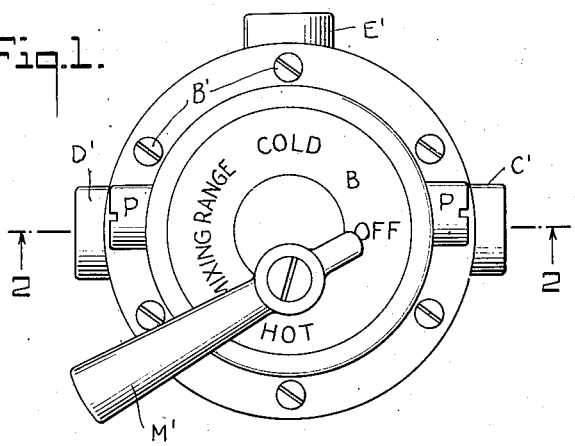
Fig. 1 is an elevation of a mixing valve.
Figure 2:
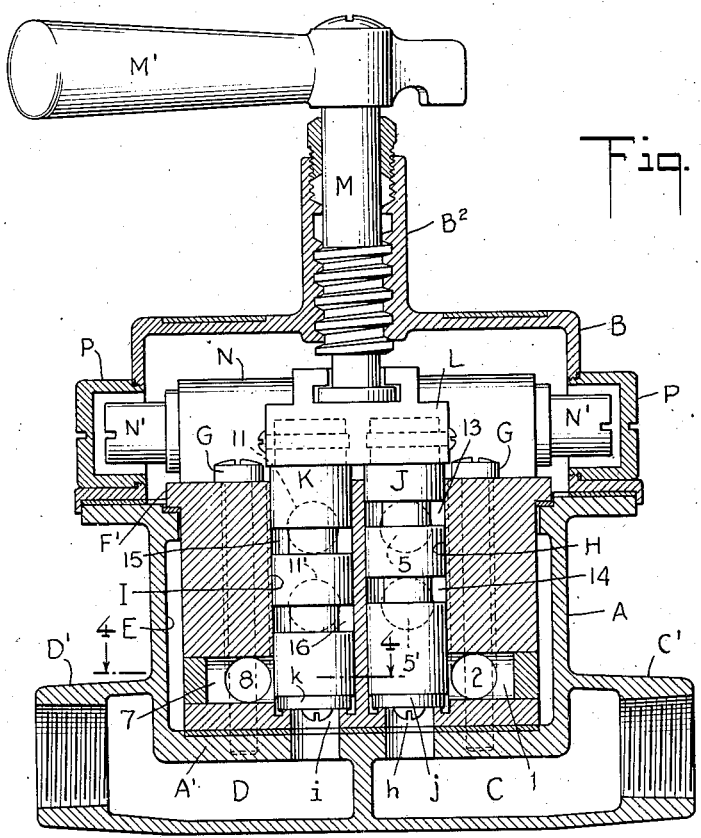
Fig. 2 is a section on the line 2—2 of Fig. 1.

In Figs. 1–5 I have illustrated a mixing valve structure embodying a preferred form of the present invention, and comprising a chambered valve housing or body A and a separable housing bonnet portion B detachably connected by screws B' to one end of the valve body. In Fig. 2 the valve is shown in an upright position with the bonnet B above the valve body A and with the valve spindle M vertically disposed and extending upward through a tubular bushing portion B² of the bonnet B, and carrying a handle M' at its upper end. For convenience of description, the valve structure will be described as though the upright valve position shown in Fig. 2 were the usual or normal position. In fact, the valve is commonly used with the valve spindle horizontally disposed and with the lower portion of the valve structure as seen in Fig. 2, embedded in a vertical wall in which the hereinafter mentioned pipes connected to the valve body are concealed.

The valve body A is formed adjacent its lower end with cold and hot water inlet chambers C and D, respectively, and with tubular internally threaded portions C' and D' for the connection to the valve body of hot and cold water supply pipes (not shown), which supply water to the chambers C and D, respectively. The valve body comprises a main cylindrical wall portion surrounding a discharge or outlet chamber E and is formed with a tubular portion E' internally threaded for the attachment to the valve body of a pipe (not shown) through which water may pass from the mixing valve to a showerhead or other device to which water is to be supplied at a regulated temperature. The discharge chamber E is of annular shape and has its inner wall formed by the cylindrical body portion of a chambered valve block member F. The lower end of the block F abuts against a horizontal wall portion A' of the valve body which forms the upper walls of the supply chambers C and D. The block F is formed with an outturned flange F'' at its upper end. The flange F'' extends over an annular upwardly facing upper end portion of the valve body A, directly above the upper edge of the annular discharge chamber E. The block F is detachably secured to the valve body A by clamping bolts or screws G having their threaded lower ends screwed into threaded sockets formed in the wall A'. Gasket material may be used in customary manner to insure tight joints between the lower end of the block F and the wall A', and between the flange F'' and the adjacent upper end portion of the valve body.

Side by side, vertically disposed, cylindrical valve chambers H and I are formed in the block F, and respectively receive longitudinally movable piston valve members J and K. The valve members J and K extend upwardly out of the block F into the space between said block and the bonnet B, and are detachably connected to a common yoke or connecting member L in said space. The member L is swivel connected to the lower end of the threaded valve spindle M which passes through the internally threaded bushing portion B² of the bonnet B, and has its upper end connected to the valve handle M'. The lower ends of the valve chambers H and I are restricted in cross section to form hot and cold water inlet ports h and i. The ports h and i communicate with the subjacent inlet chambers C and D, respectively, through openings formed in the wall A' in register with said ports. The valve members J and K have valve washers j and k secured to their lower ends to engage valve seats surrounding the upper ends of the ports h and i respectively, when the valve members J and K are in their closed positions, as shown in Fig. 2.

When the valve handle M' is rotated in the opening direction, the valve members J and K are moved away from and open the ports h and i, respectively. As is hereinafter explained, when the hot and cold water supply pressures are normal, an initial movement of the valve members J and K away from their closed positions establishes communication between the cold water inlet chamber C and the discharge chamber E. As the movement of the valve members away from their closed positions continues, communication between the hot water supply chamber D and the discharge chamber E is established. As the movement of the valve members away from their closed positions continues, the valve member J throttles and eventually closes communication between the cold water inlet chamber C and the discharge chamber E, while the valve member K is gradually increasing the flow between the hot water inlet chamber and the discharge chamber E to a maximum.

The path of flow between the chambers C and E comprises a channel 1 formed in the block adjacent its lower end and transverse to, and open at one end to the valve chamber H. The channel 1 communicates through a transverse channel 2 with a channel 3 parallel to and alongside the valve chamber H, as shown in Figs. 4 and 5. As is shown in Fig. 5, the upper end of the channel 3 is normally in communication with the upper end of a channel 4 through a segregated portion of a horizontal pressure balancing valve chamber N formed in the block F above its flange F'. The channel 4 is parallel to and adjacent the upper portion of the valve chamber H, and communicates with the latter through transverse ports or channels 5 and 5' at greater and lesser distances respectively from the lower end of the block F. At the opposite side of the valve chamber H from the channels or ports 5 and 5', ports 6 and 6' are formed in the block F through which the valve chamber H may communicate with the discharge chamber E. The block member F is formed with channels or ports 7, 8, 9, 10, 11, 11', 12 and 12', which are associated with the valve chamber I, as the ports or passages 1, 2, 3, 4, 5, 5', 6 and 6' are respectively associated with the valve chamber H. The upper ends of the channels 9 and 10 are normally in communication through a second segregated portion of the pressure equalizing valve chamber N, as is shown in Fig. 5.

The angular adjustment of the valve spindle M moves the valve members J and K away from and toward the ports h and i, respectively, and thus opens and closes communication with the cold water supply chamber C and the channel 3, and between the hot water supply chamber D and the channel 9. As will be observed, the valve spindle M is at one side, and the channels 3, 4, 9 and 10 are at the opposite side of a plane parallel to the axes of the channels 3, 4, 9 and 10 and extending between said channels and the valve chambers H and I. The communication between the channels 3 and 4 and the communication between the channels 9 and 10 are normally subjected to inverse throttling effects on variations in the relative values of the cold and hot water supply pressures, by a pressure balancing valve O in the valve chamber N. The operation of the valve O is hereinafter explained.

The fact that the gradual adjustment of the valve members J and K away from their closed positions first initiates the discharge of cold water, and then produces the discharge of a mixture including a hot water component which tends to increase, and a cold water component which tends to decrease in magnitude as the opening movement of the valve members J and K away from their closed position progresses, results from the formation of flow spaces or channels 13 and 14 in the valve member J and flow spaces or channels 15 and 16 in the valve member K, and from the disposition of the channels 13, 14, 15 and 16 relative to one another and relative to the previously mentioned channels 5, 5', 6 and 6', 11, 11', 12 and 12'.

As shown, each of the channels 13 and 14 in the valve member J is in the form of a peripheral groove. The grooves or flow passages 13 and 14 are so located along the length of the valve member J that when the latter is in or near its closed position, the groove 13 provides communication through the valve chamber H between the channels 5 and 6, and the groove 14 establishes communication between the channels 5' and 6'. As will be apparent from Figs. 2 and 3, as the valve member J approaches and then moves into its wide open position, it reduces and eventually closes communication between the passages 4 and the outlet chamber E. As is clearly indicated in Fig. 2, movement of the valve member K progressively away from its closed position moves the grooves 15 and 16 first into partial, and then into full register with the discharge ports 12 and 12'. In effect, the channels 5, 13 and 6 are duplicates of the flow spaces or ports 5', 14 and 6', and the channels 11, 15 and 12 are duplicates of the channels 11', 16 and 12', respectively. In each case, the duplication facilitates the formation of a flow path of suitably large maximum cross-sectional area between the corresponding channel 4 or 10, and the outlet chamber E.

Variations in the relative pressures at which hot and cold water is supplied to the mixing valve are normally prevented from varying the temperature of the mixture passing through the outlet chamber E, by the previously mentioned pressure equalizing valve O.

In the form shown, the valve O is of the floating piston type comprising a central piston portion 17 and piston portions 18 and 20 at opposite sides of, and spaced away from the piston portion 17. The piston portions 18 and 20 are respectively connected to the piston portion 17 by co-axial tubular portions 19 and 21, respectively, of the valve O, which are smaller in diameter than said pistons, each of the latter having a sliding fit in the cylindrical valve chamber N. As is shown in Fig. 5, the water pressure in the annular portion 19' of the chamber N surrounding the piston portion 19, is transmitted to the right end of the chamber N through an axial piston channel 21 which is open at its right end and communicates with said annular portion 19' of the chamber N through radial ports 22 in the tubular valve portion 19. Similarly, the pressure in the annular space 21' surrounding the tubular portion 21 of the valve O is transmitted to the left end of the chamber N through radial ports 23 formed in the tubular valve portion 21 and through the bore of said tubular portion which is open at its left end. To permit inspection and replacement of the valve O, the ends of the valve chamber N are provided with removable closures N' shown as threaded into the ends of said chamber. To facilitate the removal and replacement of the valve O, the latter is provided with open ended tubular extensions 24 and 25 at its opposite ends.

The valve O with its extensions 24 and 25 is of greater length than the chamber N, and each closure member N' is elongated and formed with a cavity having an internal diameter somewhat greater than the external diameter of the corresponding extension which extends into the cavity. In the normal condition of the mixing valve mechanism, the end closures N' for the pressure equalizing chamber N are within the space enclosed by the bonnet B. To permit the removal and replacement of the closures N', a separate opening substantially coaxial with each closure part N' normally closed by a corresponding closure element P, is formed in the rim portion of the bonnet member B, but each of said openings is somewhat larger in diameter than the corresponding closure part N' and is normally closed by a corresponding removable closure part P. Each closure part P may be generally similar in form to, but is of greater diameter than the adjacent closure part N', as is shown in Fig. 2. When either closure part P is disconnected from the bonnet B, the corresponding closure part N' is exposed. Preferably, the parts are so proportioned and arranged that with either closure part P and the adjacent closure part N' removed, the corresponding extension portion 25 or 26 of the valve member O will extend through the rim opening in the bonnet into position in which it may be grasped by the hand of the operator.

Unless there is a total failure of one or the other of the hot and cold water supply pressures, the valve O does not move into a position in which it entirely closes communication between the channels 3 and 4 through the valve chamber space 19', or into a position in which it entirely closes communication between the channels 9 and 10 through the valve chamber space 21'. However, on an increase or decrease in the cold water supply pressure relative to the hot water supply pressure, the valve O moves in one direction or the other as required to so inversely throttle communication between channels 3' and 4 and between the channels 9 and 10 as to maintain equality between the hot and cold water pressures in the valve chamber spaces 19' and 21'. In the form shown in Fig. 5, the inverse throttling effects of the valve O are produced on longitudinal movements of the valve by the varying throttling actions of the pistons 18 and 20 on the restricted ports 3' and 9' respectively, through which the channels 3 and 9 communicate with the valve chamber spaces 19' and 21', respectively. With the arrangement described, the fluid pressures per unit area acting in opposite directions on the piston 18 are equal, as are the pressures per unit area acting in opposite directions on the piston 20.

In normal operation the valve O thus serves to maintain a pressure in the chamber N at each side of the piston 17 which is substantially equal to the lowermost of the pressures in the two channels 3 and 9, so that the pressures in the channels 4 and 10 are normally equal, notwithstanding the inequality of the pressures in the channels 3 and 9. With equal pressures in the channels 4 and 10 and with constant cold and hot water supply temperatures, the vertical adjustment of the valves J and K, which gives a desired exit water temperature with the then existing hot and cold water supply pressures, will maintain that water delivery temperature notwithstanding ordinary variations in the cold water supply pressure relative to the hot water supply temperature, so long as the pressure balancing valve O is in its normal operative condition.

In the use of a mixing valve having an automatic pressure equalizing mechanism operating in the general manner described above, there is a tendency of the floating pressure equalizing valve to stick in the valve chamber in which it works if the water passing through the valve contains some impurity or impurities forming deposits in solid form on the walls of chambers and passages through which the water passes. As such valve mechanisms have been constructed heretofore, it has not been possible to readily inspect and clean or replace the pressure equalizing valve. With the present invention, however, the removal of either closure element P and the removal of the associated closure N' exposes an end portion of the valve O and permits the valve to be removed by force applied to the exposed end of the valve. There are obvious practical advantages in providing removable closures for both ends of the valve chamber. In some cases the installations are of a character making it more feasible to open one rather than the other end of the valve chamber. The removal of both end closures facilitates inspection and cleaning of the valve chamber.

The general form and arrangement of the valve mechanism shown in the drawings is practically advantageous because of the simplicity and compactness of the mixing valve structure and because all of the valve channels and chambers in the valve block F may be formed by simple drilling and reaming operations, and contribute to desirable structural simplicity and compactness. In some cases, it may be practically desirable to temporarily or permanently eliminate the operation of the pressure equalizing valve. For example, it may develop in some uses of the valve that the water handled contains impurities of such character as to make the continued use of the pressure balancing mechanism undesirable. In such case, the valve may be readily put into condition for operation in the manner in which it would operate if not provided with automatic pressure balancing. This result may be secured, in the case of a valve already installed, by the simple expedient of anchoring the valve O against movement out of its position shown in Fig. 5, as by means of spacers interposed between the ends of the floating valve and the end closures N'. Alternatively, as described in my above mentioned prior application, the pressure equalizing valve member may be replaced by an element especially provided for the purpose.

As will be apparent, the form and arrangement of the pressure balancing valve and the cylinder in which it works, may be varied while leaving the end of the balancing valve chamber accessible at either end. Thus, as shown in Fig. 6, a piston valve OA having piston portions 17, 18 and 20 like the piston portions 17, 18 and 20 of the valve O, may be mounted in a cylinder lining element Q comprising a tubular body with external circumferential ribs 30, 31 and 32 which have a driving fit in a cylinder NA formed in the block F, just as is the cylinder N of the construction first described. The rib 30 is in position to prevent communication between the channels 4 and 10 through the space in the cylinder chamber NA external to the body of the lining element. Similarly, the circumferential rib 31 prevents communication between the channels 3 and 4 through any portion of the chamber NA external to the element Q, and the rib 32 prevents communication between the channels 9 and 10 through any portion of the chamber NA external to the element Q.

Radial ports 33, 34, 35 and 36 in the member Q permit communication of the channels 3, 4, 10 and 9, respectively, with the bore of said member.

The ribs 18 and 20 of the valve member OA inversely throttle the ports 33 and 36 to produce regulating effects like those produced in Fig. 5 by inversely throttling the ports 3' and 9'.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent is:

1. A mixing valve comprising a hollow housing shell structure with juxtaposed, spaced apart openings, closure means normally closing but movable to open each of said openings, a partition wall structure within said shell including walls surrounding cold and hot water inlet chambers, an outlet chamber, a pressure equalizing chamber extending between and in substantial alignment with said openings, and passages and ports forming separate inflow paths from said cold and hot water inlet chambers to respectively different portions of said pressure equalizing chamber and forming a separate outflow path to said outlet chamber from each of said equalizing chamber portions, a pressure equalizing valve element in said equalizing chamber forming a movable partition between said chamber portions and being automatically adjustable in response to variations in the water pressures in said inflow paths to inversely throttle the flows between the two inflow paths and the corresponding outflow path as required to equalize the water pressures in said outflow paths, valve means adjustable to inversely throttle said outflow paths to thereby control the temperature of the water in said outlet chamber, said partition structure also including a separable end wall part for each end of said equalizing chamber, each end wall part and said equalizing valve element being removable and replaceable through either of said shell openings when the latter is opened.

2. A mixing valve comprising a hollow housing shell structure with juxtaposed, spaced apart openings, a separable closure device normally closing but removable to open each of said openings, a partition wall structure within said shell including walls surrounding cold and hot water inlet chambers, an outlet chamber, parallel cold and hot water valve chambers and a pressure equalizing chamber extending between and in substantial alignment with said openings, movable hot and cold water valve element in said hot and cold water valve chambers, respectively, a longitudinally movable pressure equalizing valve element in said equalizing chamber, the walls of said valve chambers and pressure equalizing chamber being formed with ports variably throttled by the respective valve elements in said chambers as said elements are adjusted, said partition structure including a separable end wall part for each end of said equalizing chamber, each end wall part and said equalizing valve element being removable and replaceable through either of said shell openings when the latter is opened, a valve adjusting element connected to said hot and cold water valve elements and extending through said shell.

3. A mixing valve as specified in claim 2, in which the axis of said pressure equalizing chamber lies in a plane to which each of said cold and hot water valve chambers is perpendicular.

JAMES FRASER.

REFERENCES CITED

The following references are of record in the file of this patent:

UNITED STATES PATENTS

| Number | Name | Date |
|---|---|---|
| 962,111 | Assmann | June 21, 1910 |
| 1,508,938 | Powers | Sept. 16, 1924 |
| 2,250,815 | Egg | June 29, 1941 |
| 2,277,314 | Gallagher | Mar. 4, 1942 |
| 2,308,127 | Symmons | Jan. 12, 1943 |